Nov. 23, 1948. W. J. RYSICK 2,454,483
SWIVEL CONNECTION OR JOINT
Filed May 2, 1947
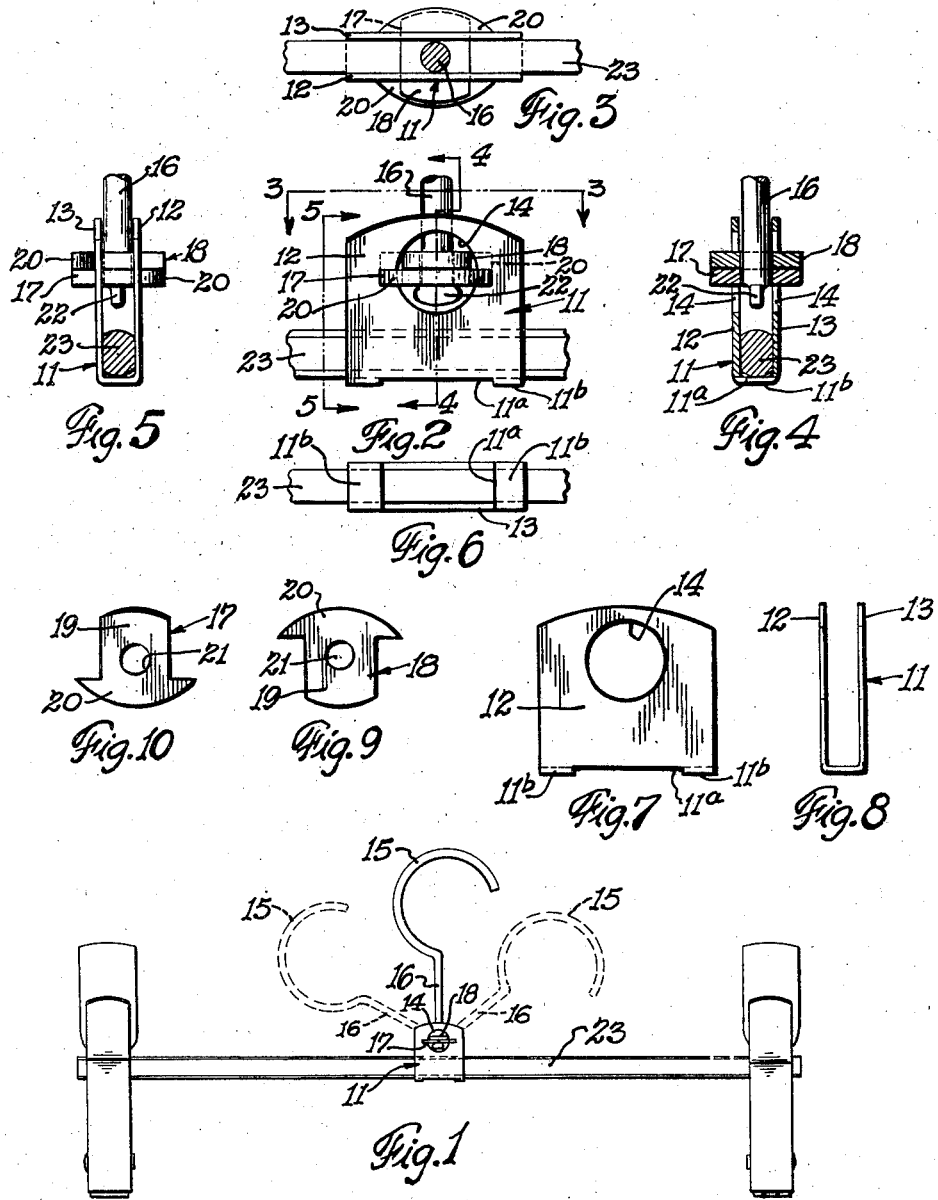
INVENTOR.
Walter J. Rysick
BY Frank Schraeder Jr.
Attorney Patented Nov. 23, 1948

2,454,483

UNITED STATES PATENT OFFICE 2,454,483

SWIVEL CONNECTION OR JOINT

Walter J. Rysick, Fort Wayne, Ind.

Application May 2, 1947, Serial No. 745,524

9 Claims. (Cl. 287—91)

The present invention has for its primary object to produce a simple, novel and inexpensive swivel joint between a member, such as, for example, a garment hanger, and a second member that may, for example, be the hook for suspending the hanger.

In many forms of garment hangers it is desirable that a suspending hook be foldable against the body of the hanger, for compactness when shipping or storing the same; and that the hook be capable of being turned about a vertical axis, at the time of engaging it with a support, so as to enable it to cooperate with various kinds of stationary supports that may be encountered in use.

Viewed in one of its aspects, the present invention may therefore be said to have for its object to produce a simple, novel and efficient swivel joint that will permit one of two connected members to turn about its own axis relatively to the other, as well as to swing bodily about another axis at right angles to that axis.

The various features of novelty whereby the present invention is characterized will hereinafter be pointed out with particularity in the claims, but, for a full understanding of the invention and of its objects and advantages, reference may be had to the following detailed description taken in connection with the accompanying drawing, wherein:

Figure 1 is a front view of a general type of garment hanger having a swivel suspending means embodying the present invention; Fig. 2 is a view similar to Fig. 1, but on a larger scale, showing only the suspending means and a small adjacent fragment of the hanger; Fig. 3 is a section on line 3—3 of Fig. 2; Fig. 4 is a section approximately on line 4—4 of Fig. 2; Fig. 5 is a section on line 5—5 of Fig. 2; Fig. 6 is a bottom plan view of the parts appearing in Fig. 2; Fig. 7 is a front view of the suspended member of the swivel joint device; Fig. 8 is an end view of the latter member; Fig. 9 is a plan or face view of one of the two like parts of the two-piece trunnion device; and Fig. 10 is a view of the second part of the trunnion device, turned end for end with respect to the other part, as is the case in the normal use of the device.

Referring to the drawing, 11 represents one of two members to be united by a swivel connection, the same having thereon two spaced, parallel wings 12 and 13. In the arrangement shown, member 11 comprises a thin metal plate bent into a deep, narrow U-shaped trough, the sides of the trough constituting the wings. Each wing is shown as having therein a large round opening 14 directly opposite that in the other wing.

The second of the two members to be united is illustrated as taking the form of a hook 15 having a stem 16 extending down between the wings and there connected to a novel trunnion.

In the preferred form the trunnion consists of two like parts, 17 and 18, conveniently thick T-shaped plates lying flat upon each other, each such plate comprising a stem portion 19 and a cross arm or head 20, and containing a hole 21 in the stem portion thereof. The parts are so proportioned that, when the two trunnion sections are inserted through the openings 14 from opposite sides of member 11, the heads or cross arms engage the opposite outer faces of member 11 at the same time that the holes 21 register with each other. Upon inserting the stem of the suspending member in these registering holes, the two trunnion sections are locked together and serve to keep the wings of member 11 from spreading apart. The end of the stem is flattened as at 22, or otherwise expanded, on the under side of the trunnion plates to complete the connection and prevent upward withdrawal of the stem through the holes in the trunnion plates. The stem can turn about its own axis in the trunnion.

The trunnion device has a rotatable fit in the openings in the wings of member 11, so that the hook or suspending member may swing bodily in a plane between and parallel to the wings, as shown in dotted lines in Fig. 1. In the particular construction illustrated, the cross sectional configuration of the body portion of the trunnion is a rectangle about which the circles formed by the edges bounding the round openings 14 are circumscribed.

Member 11 may be the thing which it is desired to suspend, or it may be used to support some other thing. In the example illustrated, the openings 14 in member 11 are near the upper ends of the wings, leaving room in the trough below the trunnion for the reception of a cross bar 23 that forms part of a conventional garment hanger; the swivel unit being located midway between the ends of the bar. Member 11 and the bar may be held against relative movements by the clamping action of member 11 on the bar or by other means, such as welding, if desired.

The capacity for lateral swinging movements of the suspending hook make it possible to fold the hook down to lie close to the bar during storage and shipping; whereas the bodily turning movements of the hook permit the hook to position itself properly as required for engagement with supports that are parallel with or at any angle to the bar element of the hanger. Furthermore, the swivel unit as a whole consists of only a few rugged parts requiring only simple operations for their production and assembly; and it is, therefore, easy to manufacture, inexpensive, and sturdy.

If the member 11 is more or less resilient it can cause the two parts of the trunnion device to be pulled in opposite directions and thus grip the stem of the hook, thus frictionally holding the stem against turning in the trunnion. At the same time the heads or shoulders on the ends of the trunnion will be in frictional contact with the outer faces of the wings, thereby exerting a frictional pressure to prevent the trunnion from turning. In this way the hook can be placed at any desired angle relative to each of the axes about which it may turn, to remain there until intentionally shifted.

As shown more clearly in Figs. 2, 4, and 6, I prefer to construct the member 11 with an opening 11$^a$ in the horizontal portion thereof; the opening 11$^a$ extends between the laterally spaced horizontal portions 11$^b$ which serve to connect the wings 12 and 13, the width of the opening 11$^a$ being substantially equal to the transverse width of the member 11. This construction imparts the desired flexibility to the member 11 during forming operation thereof and also facilitates its assembly with another member such, as for example, the bar 23.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. A swivel unit including two members, one of which has parallel, spaced wings containing openings opposite each other, a trunnion device, divided lengthwise into two parts, extending transversely of said wings through and journalled in said openings, each trunnion part having at one end a head engaged with the outer side of the adjacent wing, the heads being at opposite ends of the trunnion device, said trunnion device having at the middle a transverse hole that passes through both parts thereof, and the second of said members having a part extending through said hole and having thereon a shoulder to prevent withdrawal of such part through the said hole, the axis of said second part extending perpendicularly to the axis of the trunnion device.

2. A swivel unit as set forth in claim 1, wherein the second member is free to turn about its axis as well as having the capacity to swing bodily about the axis of the trunnion device.

3. A swivel unit including two members one of which is provided with two parallel wings spaced apart from each other and containing round openings directly opposite each other, a trunnion device divided lengthwise into two parts extending transversely of said wings through said openings, said device containing a hole that passes through both of said parts, the second of said members having an element extending into the space between said wings and through said hole in the trunnion device, said element having on its end, beyond the trunnion device, a shoulder to prevent its withdrawal from the trunnion.

4. A swivel unit including two members one of which is provided with two parallel wings spaced apart from each other and containing round openings directly opposite each other, a trunnion device divided lengthwise into two parts extending transversely of said wings through said openings, said device containing a hole that passes through both of said parts, each of said trunnion parts having a head on one end and the two parts being so disposed that said heads are located at opposite ends of the trunnion device, the second of said members having an element extending into the space between said wings and through said hole in the trunnion device, said element having on its end, beyond the trunnion device, a shoulder to prevent its withdrawal from the trunnion.

5. A swivel unit as set forth in claim 4, wherein the two parts of the trunnion device are duplicate T-shaped structures.

6. A swivel unit comprising a member having two parallel wings spaced apart from each other and containing large, round openings directly opposite each other, a trunnion device formed of two like T-shaped thick plates lying flat upon each other with the stems of the T-shaped plates extending transversely of the wings through said openings, the cross arm of one T-shaped plate being on the outer side of one wing and the cross arm of the other T-shaped plate being on the outer side of the other wing, said stems containing registering holes, and a rod-like element extending at one end through said holes and having on that end a shoulder to prevent withdrawal of that end through said holes.

7. A swivel unit as set forth in claim 6, wherein the combined cross-sections of the two parts of the trunnion device, at said openings, form a rectangle that is circumscribed by the circles constituting the edges bounding the holes in the wings.

8. In combination, a member to be supported having two spaced, parallel wings containing round openings opposite each other, a trunnion device divided lengthwise into two parts extending transversely of the wings through and rotatable in said openings, said trunnion device having a hole extending through both parts thereof between and with its axis parallel to said wings, and a suspending rod extending through and rotatable in said hole, said rod having on its end a shoulder to prevent withdrawal of the rod.

9. A swivel unit comprising a member formed of a thin plate of substantial width bent on transverse lines into a U shape, the arms of the U containing near their free ends round openings directly opposite each other, a trunnion device composed of two like, thick, T-shaped plates the stem elements of which extend through said openings from opposite sides of said member, said trunnion device containing a hole extending transversely thereof through both of said stem elements, and a second member having a part that extends through and is journalled in said hole and which has thereon a shoulder to prevent withdrawal of the same from the hole; the parts being so proportioned that when the second member is connected to the trunnion device, the cross arms of the T-shaped plates are held in clamping relation to the wings.

WALTER J. RYSICK.

REFERENCES CITED

The following references are of record in the file of this patent:

UNITED STATES PATENTS

| Number | Name | Date |
|---|---|---|
| 449,324 | Kelley | Mar. 31, 1891 |
| 556,929 | Jameson | Mar. 24, 1896 |
| 1,594,197 | Hofmann | July 27, 1926 |

FOREIGN PATENTS

| Number | Country | Date |
|---|---|---|
| 21,405 | Great Britain | Aug. 28, 1913 |